(12) United States Patent  (10) Patent No.:     US 6,731,404 B1
Zuravleff                                (45) Date of Patent:         May 4, 2004

(54) HALFTONE AND ERROR DIFFUSION RENDERING CIRCUITS

(75) Inventor: William K. Zuravleff, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/433,114

(22) Filed: Nov. 3, 1999

(51) Int. Cl.[7] .............................................. G06K 15/00
(52) U.S. Cl. ...................... 358/3.05; 358/3.03; 358/3.04
(58) Field of Search ............................... 358/3.05, 3.03, 358/3.04, 518, 537, 3.27; 382/264

(56) References Cited

U.S. PATENT DOCUMENTS 5,870,503 A  *  2/1999  Kumashiro
5,911,009 A  *  6/1999  Ikuta

FOREIGN PATENT DOCUMENTS

| JP | 407143339 | * | 6/1995 | .......... H04N/1/405 |
| JP | 409116749 A | * | 5/1997 | .......... H04N/1/405 |

* cited by examiner

*Primary Examiner*—Jerome Grant, II
(74) *Attorney, Agent, or Firm*—Fliesler Meyer LLP

(57) ABSTRACT

Circuits for rendering according to the present invention are operable to function in either halftone mode or error diffusion mode. A pixel multiplexor selects between a rasterized unrendered pixel signal from an input rasterized unrendered datastream in halftone mode and an error diffusion adjusted pixel signal generated by error diffusion hardware in error diffusion mode. A memory stores the current error diffusion state signal and retrieves it as the previous error diffusion state signal during the processing of the appropriate pixel in the next scan line in error diffusion mode. A threshold multiplexor selects between an error diffusion threshold signal and a halftone threshold signal. In halftone mode, the memory is operable to retrieve a halftone threshold signal which is supplied to the threshold multiplexor. A read address generator provides a read address signal to the memory for indicating the memory location from which to read either the previous error diffusion state signal or the halftone threshold signal. The read address generator includes a read address multiplexor for selecting between an error diffusion read address signal and a halftone read address signal. The read address generator further includes a stride multiplexor for providing the selected stride signal. The stride multiplexor has at least two stride inputs which receive stride signals corresponding to the appropriate stride values for error diffusion mode and halftone mode. A reset multiplexor provides the capability to set the read address signal either to a predetermined starting read address signal value or to the next read address signal.

24 Claims, 4 Drawing Sheets

HALFTONE AND ERROR DIFFUSION RENDERING CIRCUITS

BACKGROUND OF THE INVENTION

1. Field of the Invention

The present invention pertains to the field of rendering grayscale data on a binary marking engine such as are found in low cost digital copiers and printers. Specifically, the present invention pertains to the field of hardware support for halftone rendering and error diffusion rendering.

2. Discussion of the Related Art

Halftoning and error diffusion are two well-known algorithms for rendering color or black and white grayscale data on a binary marking engine. Many display and hardcopy devices are bilevel—they produce just two intensity levels, either "on" or "off".

In the technique known as halftoning, each small resolution unit of area in the rendered output is imprinted with black ink whose area is proportional to the blackness 1-I (where I is intensity) of the corresponding area in the original unrendered input. For example, a 2×2 pixel area of a bilevel display can be considered the small resolution unit. In this case, each 2×2 pixel area can be used to produce five different intensity levels at the cost of halving the spatial resolution along each axis. This result is accomplished by turning "on" either none, 1, 2, 3, or all 4 of the four pixels in the small resolution unit. In general, an n×n group of bilevel pixels can provide $n^2+1$ intensity levels but lowers the spatial resolution on each axis by a factor of 1/n.

In the technique known as error diffusion, the error between the rendered pixel value and the corresponding unrendered pixel value is computed. The error is added to the values of the four image-array pixels to the right of and below the pixel in question: 7/16 of the error to the pixel to the right, 3/16 to the pixel below and to the left, 5/16 to the pixel immediately below, and 1/16 to the pixel below and to the right. This has the effect of spreading, or diffusing, the error over several pixels in the image array.

Each of the halftone and error diffusion techniques has advantages in distinct situations. For example, it has been known in the art that error diffusion can have both superior tone response and detail rendition as compared to halftoning on high quality marking engines. Alternatively, for a lower quality marking engine in which dot gain and dot misregistration limit image quality, the clustered dot halftoning algorithm has been shown to somewhat mitigate the adverse effects of the lower print quality. Therefore, the specific marking engine to be used or the source material to be rendered may make one algorithm more suitable than the other.

It is therefore desirable to have the capability to perform either rendering technique. These rendering techniques are suitable for implementation in hardware, for example, on an integrated circuit. However, to implement two separate hardware renderers is expensive, especially given that one of the hardware renderers will be idle at any given time. As is apparent from the above discussion, a need exists for a lower cost hardware renderer capable of selectively performing either halftone or error diffusion rendering.

SUMMARY OF THE INVENTION

Conventional circuits for rendering color or black and white grayscale data on a binary marking engine operate either according to a halftoning algorithm or according to an error diffusion algorithm. Because each algorithm has its distinct advantages, it is desirable to implement a marking engine capable of functioning in either error diffusion mode or halftone mode. However, conventionally the duplicative hardware needed to implement both an error diffusion renderer and a halftone renderer is prohibitively expensive for many applications. An object of the present invention is to implement a circuit for rendering capable of operating in either an error diffusion mode or a halftone mode without unduly increasing the hardware cost of supporting both modes.

The present invention describes how one renderer serve as either a halftone renderer or an error diffusion renderer. Importantly, the more expensive portions of either renderer—the memory and memory bandwidth—are reused according to the present invention, so that the incremental cost of including an additional rendering algorithm is very low. According to the present invention, only one set of logic performs either halftoning or error diffusion rendering. Compared to conventional logic which performs only error diffusion, the incremental cost of implementing the combined halftoning/error diffusion renderer according to the present invention is very low.

According to the present invention, circuit implementations generate a rasterized rendered datastream from a rasterized unrendered datastream using either a halftone or error diffusion algorithm. Thus, the circuits according to the present invention are operable to function in either halftone mode or error diffusion mode.

The circuits according to the present invention include a comparator for comparing an unrendered pixel signal and a threshold signal regardless of whether or not the circuit is operating in halftone mode or error diffusion mode.

According to an aspect of the present invention, a pixel multiplexor selects between a rasterized unrendered pixel signal from an input rasterized unrendered datastream when in halftone mode and an error diffusion adjusted pixel signal generated by error diffusion hardware when in error diffusion mode. The error diffusion hardware which produces the error diffusion adjusted pixel signal includes an error diffusion adder which adds the rasterized unrendered pixel signal from the input rasterized unrendered datastream to an error diffusion feedback signal generated by an error diffusion filter. The error diffusion filter takes the unrendered pixel signal from the pixel multiplexor operating in error diffusion mode and the binary rasterized rendered output signal from the comparator as inputs. The difference between the binary rasterized rendered output signal and the unrendered pixel signal represents the total error which must be distributed to other pixels according to the error diffusion algorithm. The error diffusion filter produces the error diffusion feedback signal and a current error diffusion state signal as outputs. The error diffusion feedback signal represents error to be distributed to the subsequent pixel in the same scan line. The current error diffusion state signal represents error to be distributed to a pixel in the next scan line. Thus, the circuits according to the present invention include a memory for storing the current error diffusion state signal and for retrieving it as the previous error diffusion state signal during the processing of the appropriate pixel in the next scan line when operating in error diffusion mode. The error diffusion adder adds the previous error diffusion state signal from the memory and adds it to the rasterized unrendered pixel signal from the input rasterized unrendered datastream and the error diffusion feedback signal generated by an error diffusion filter to produce the error diffusion adjusted pixel signal.

According to another aspect of the present invention, a threshold multiplexor selects between an error diffusion threshold signal and a halftone threshold signal depending upon whether the circuit is operating in error diffusion mode or halftone mode. The threshold multiplexor passes the threshold signal which is selected to the comparator. The circuit preferably also includes an error diffusion threshold register to storing the error diffusion threshold signal.

According to yet another aspect of the present invention, an error diffusion write address generator provides an error diffusion write address signal which indicates the memory location in which to store the current error diffusion state signal computed by the error diffusion filter when the circuit is operating in error diffusion mode. When operating in halftone mode, the memory is operable to retrieve a halftone threshold signal which is supplied to the threshold multiplexor.

According to another aspect of the present invention, a read address generator provides a read address signal to the memory for indicating the memory location from which to read either the previous error diffusion state signal or the halftone threshold signal.

In an embodiment of the present invention, the read address generator includes a read address multiplexor for selecting between an error diffusion read address signal produced by an error diffusion read address generator and a halftone read address signal produced by a halftone read address generator depending upon the mode in which the circuit is operating.

In an alternative embodiment of the present invention, the read address generator includes a read address register which stores the read address signal and a stride adder which computes the next read address signal by adding the read address signal to a selected stride signal. The read address generator further includes a stride multiplexor for providing the selected stride signal. The stride multiplexor has at least two stride inputs which receive stride signals corresponding to the appropriate stride values for error diffusion mode and halftone mode. The stride multiplexor includes a control input tied to a stride select signal which indicates either the error diffusion or the halftone mode. A reset multiplexor provides the capability to set the read address signal either to a predetermined starting read address signal value or to the next read address signal computed by the stride adder. The reset multiplexor has a control input tied to a reset signal.

These and other aspects, features, and advantages of the present invention are fully discussed in the Detailed Description of the Invention.

BRIEF DESCRIPTION OF THE DRAWINGS

In the Figures, like parts are referred to with like reference numerals. The Figures are more fully described in the Detailed Description of the Invention.

DETAILED DESCRIPTION OF THE INVENTION

Conventionally, integrated circuit chip hardware for color and black and white rendering for laser and ink jet printers has included separate halftoning and error diffusion renderers. This has resulted in the usage of a relatively large number of gates, a relatively large amount of on chip RAM and off chip memory, and a large off chip memory bandwidth.

However, according to the present invention, the very low incremental cost of adding halftone capability to the error diffusion circuits according to this invention makes the addition of halftone rendering compelling. According to the present invention, images are rendered in a rasterized fashion. The results are well-suited to black and white or color rendering.

Figure 1:
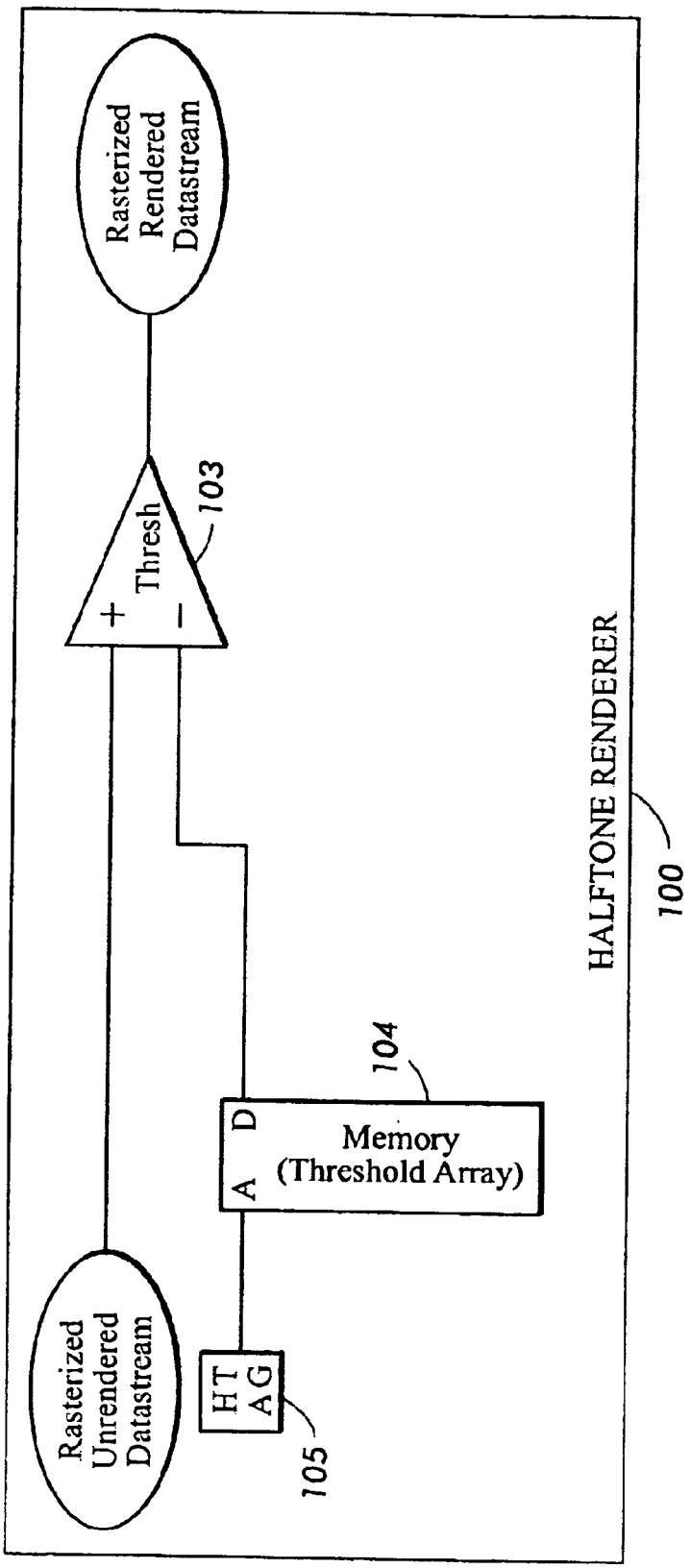
FIG. 1 illustrates a halftone renderer for generating a rasterized rendered datastream from a rasterized unrendered datastream using a halftoning algorithm.

FIG. 1 illustrates a halftone renderer for generating a rasterized rendered datastream from a rasterized unrendered datastream using a halftoning algorithm. FIG. 1 shows an implementation of a halftone renderer 100. Here, a rasterized, unrendered (multiple bits of gray-scale) image is converted to a rendered image by comparing each pixel with the value from a halftone threshold array. The result of the comparison—done by the block labeled Thresh 103—results in a binary decision of mark or no mark on paper. The threshold values in the halftone threshold array are stored in a memory 104 which is accessed by an address generator 105, generally sequentially, or sequentially with one or two stride values.

Figure 2:
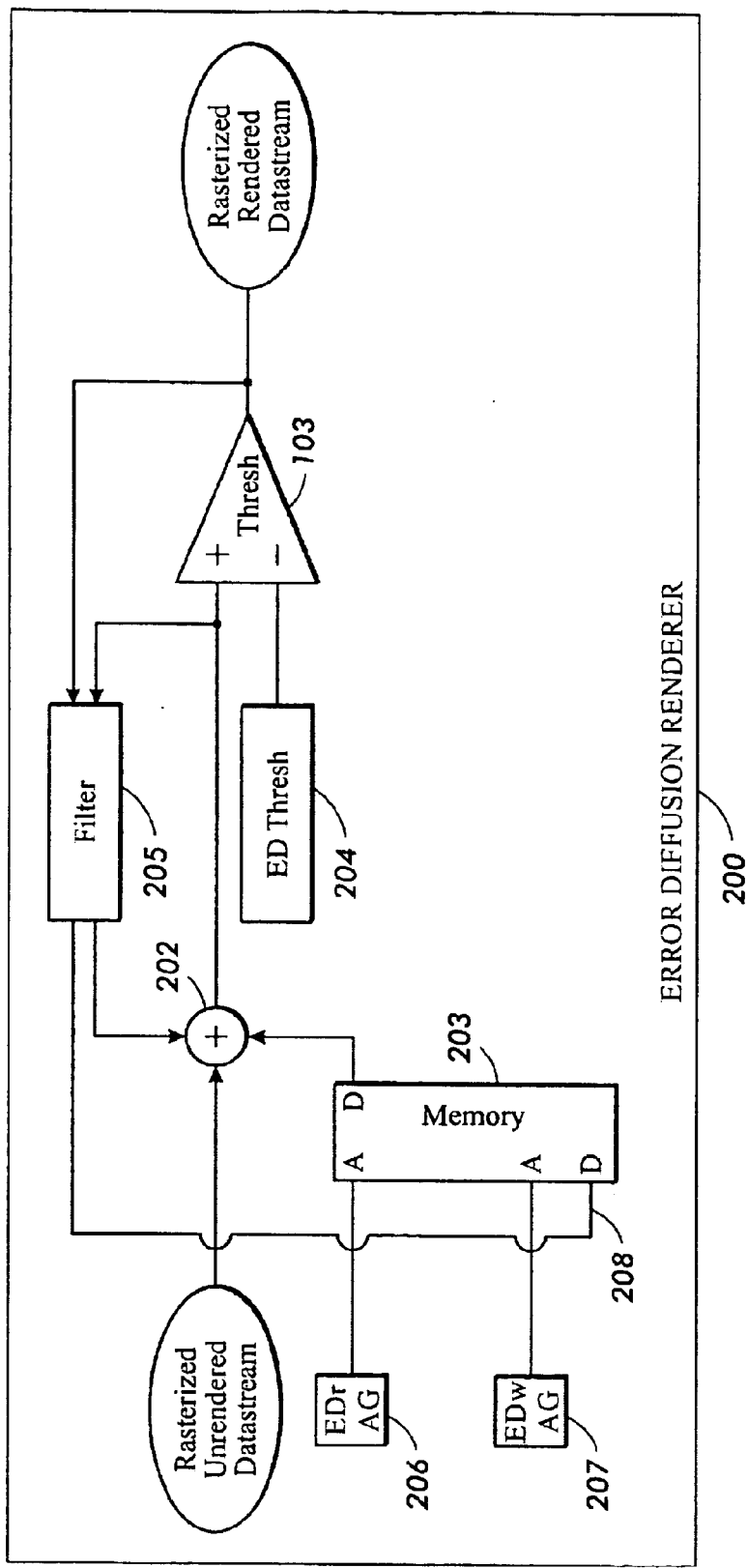
FIG. 2 illustrates an error diffusion renderer for generating a rasterized rendered datastream from a rasterized unrendered datastream using an error diffusion algorithm.

FIG. 2 illustrates an error diffusion renderer for generating a rasterized rendered datastream from a rasterized unrendered datastream using an error diffusion algorithm. FIG. 2 shows an implementation of an error diffusion renderer 200. Here, data is compared not against some value read out of memory 203 but to a value which is fixed or generated by adding some amount of noise to a fixed threshold. However, before the unrendered image data is compared by comparator 103, it is compensated by the error diffusion adder 203 with some filtered version of the past rendering decisions. Many of the same elements of the halftone renderer are present, specifically, like-formatted input and output streams, threshold comparison, memory, and address generation. The error diffusor has additional computational elements not present in the halftoner, specifically, those used for (1) compensation, (2) filtering, and (3) write address generation. Additionally, the error diffusor memory has a write port 208. Though not shown in the halftoner 100, it is desirable that the halftoner memory 104 has a write port as well to allow the changing of the threshold array.

Figure 3:
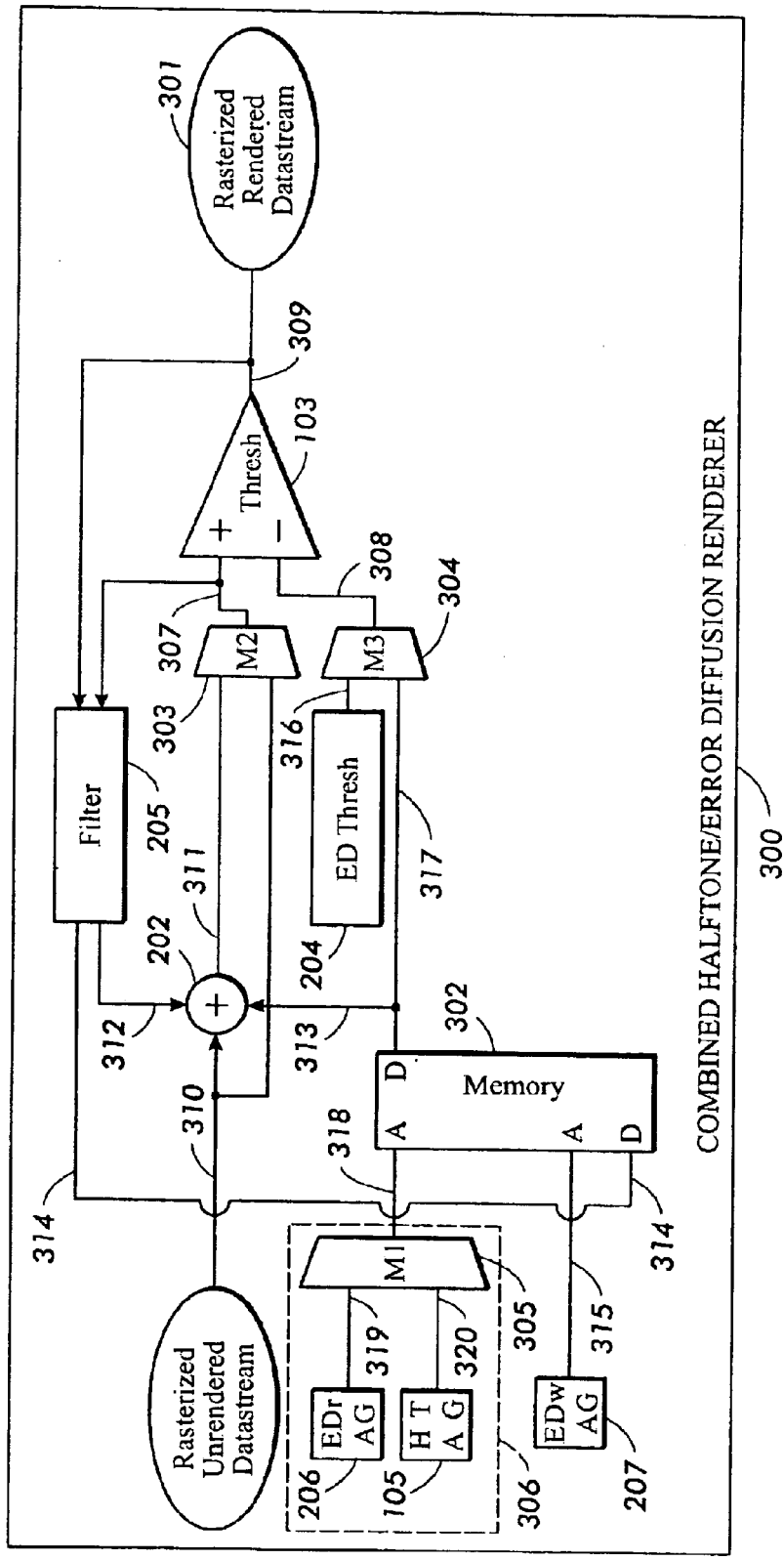
FIG. 3 illustrates a circuit according to the present invention for generating a rasterized rendered datastream from a rasterized unrendered datastream using either the halftoning algorithm or the error diffusion algorithm.

FIG. 3 illustrates a circuit according to the present invention for generating a rasterized rendered datastream from a rasterized unrendered datastream using either the halftoning algorithm or the error diffusion algorithm. If (1) halftone address generation and (2) three multiplexers labeled M1, M2, and M3 are added to the error diffusion renderer 200, then a renderer 300 shown in FIG. 3 results according to the present invention which can easily switch between the two rendering techniques. In general, the halftone address generation and multiplexors require small numbers of gates to implement compared to the memory and even compared to existing logic of the error diffusion algorithm.

According to the present invention, a circuit 300 for generating a rasterized rendered datastream 301 includes a comparator 103 for comparing an unrendered pixel signal 307 and a threshold signal 308 to produce a binary rasterized rendered output signal 309 and a pixel multiplexor 303 coupled to the comparator 103 for selecting between a rasterized unrendered pixel signal 310 and an error diffusion adjusted pixel signal 311. The circuit 300 further includes an error diffusion adder 202 coupled to the pixel multiplexor 303 for adding the rasterized unrendered pixel signal 310 and an error diffusion feedback signal 312 to produce the error diffusion adjusted pixel signal 311. The error diffusion adder 202 is operable to add a previous error diffusion state signal 313 to the rasterized unrendered pixel signal 310 and the error diffusion feedback signal 312 to produce the error diffusion adjusted pixel signal 311. The circuit 300 also includes a memory 302 coupled to the error diffusion adder 202 for storing a current error diffusion state signal 314 and for retrieving the previous error diffusion state signal 313. The circuit 300 also includes an error diffusion filter 205 coupled to the unrendered pixel signal 307 and the binary rasterized rendered output signal 309 for generating the error diffusion feedback signal 312 and the current error diffusion state signal 314. The circuit 300 includes an error diffusion write address generator 207 coupled to the memory 302 for providing an error diffusion write address signal 315 indicating a memory location in which to store the current error diffusion state signal 314. The circuit 300 includes a threshold multiplexor 304 coupled to the comparator 103 for selecting between an error diffusion threshold signal 316 and a halftone threshold signal 317.

The memory 302 is operable to retrieve a halftone threshold signal 317 and is coupled to the threshold multiplexor 304. The circuit 300 includes an error diffusion threshold register 204 coupled to the threshold multiplexor 304 for storing the error diffusion threshold signal 316. The circuit 300 includes a read address generator 306 coupled to the memory 302 for providing a read address signal 318 indicating a memory location from which to read either the previous error diffusion state signal 313 or the halftone threshold signal 317.

An embodiment of the read address generator 306 includes a read address multiplexor 305 coupled to the memory 302 for selecting between an error diffusion read address signal 319 and a halftone read address signal 320. The read address generator 306 of the circuit 300 includes an error diffusion read address generator 206 coupled to the read address multiplexor 305 for providing an error diffusion read address signal 319 indicating a memory location from which to read the previous error diffusion state signal 313. The read address generator 306 also includes a halftone read address generator 105 coupled to the read address multiplexor 305 for providing a halftone read address signal 320 indicating a memory location from which to read the halftone threshold signal 317.

Figure 4:
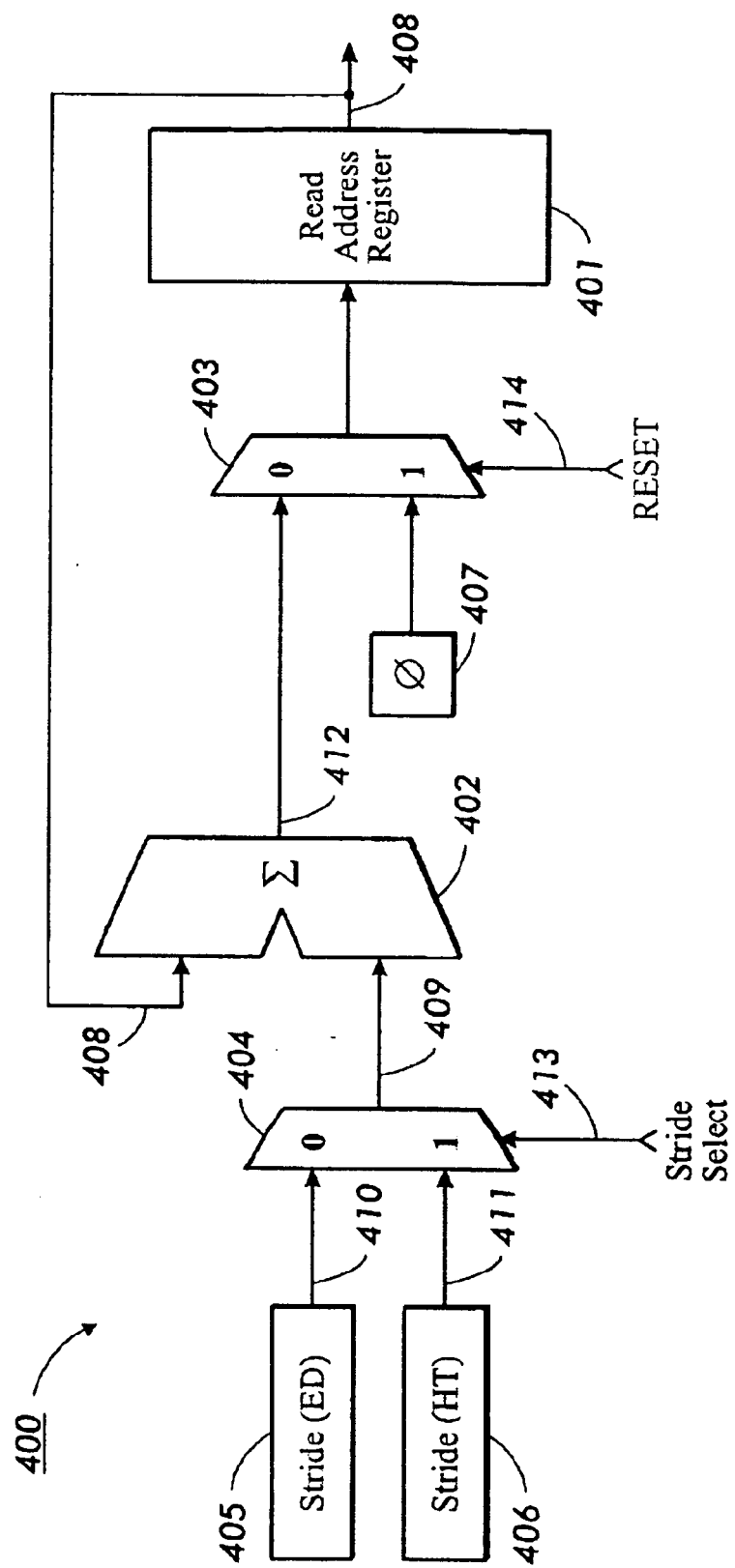
FIG. 4 illustrates a read address generator according to an embodiment of the present invention for providing a read address signal to a memory for indicating a memory location from which to read either a previous error diffusion state signal or a halftone threshold signal.

FIG. 4 illustrates a read address generator according to an embodiment of the present invention for providing a read address signal to a memory for indicating a memory location from which to read either a previous error diffusion state signal or a halftone threshold signal. According to an alternative embodiment of the read address generator 306, clever logic design also allows the elimination of some blocks shown in FIG. 3 entirely. For example, the read address generation for both error diffusion and halftoning is largely sequential. Instead of implementing both address generators and selecting between their outputs as illustrated in FIG. 3, FIG. 4 shows an alternative embodiment of the read address generator 400 in which a single address register 401 and adder 402 with selectable stride and reset options.

In the alternative embodiment of the read address generator 400 for providing the read address signal 408 to the memory 302 for indicating the memory location from which to read either the previous error diffusion state signal 313 or the halftone threshold signal 317, the read address generator 400 includes a read address register 401 for storing the read address signal 408 and a stride adder 402 coupled to the read address register 401 for adding the read address signal 408 to a selected stride signal 409 to produce a next read address signal 412. The read address generator 400 also includes a stride multiplexor 404 coupled to the stride adder 402 for providing the selected stride signal 409. The stride multiplexor 404 has first and second stride inputs coupled to first and second stride signals 410 and 411, respectively.

In the alternative embodiment of the read address generator 400, the stride multiplexor 404 further has a control input tied to a stride select signal 413. The read address generator 400 includes a reset multiplexor 403 coupled to the read address register 401 for setting the read address signal 408 either to a predetermnined starting read address signal value 407 or to the next read address signal 412. The reset multiplexor 403 has a control input tied to a reset signal 414. The first and second stride signals 410 and 411 correspond to an error diffusion stride value 405 and a halftone stride value 406, respectively.

Although the present invention has been described in its presently preferred and alternative embodiments, those embodiment are offered by way of example, not by way of limitation. It is to be understood that various additions and modifications can be made without departing, from the spirit and scope of the present invention. Accordingly, all such additions, modifications, and alternatives are deemed to lie with the spirit and scope of the present invention as set out in the appended claims.

What is claimed is:

1. A circuit for generating a rasterized rendered datastream, the circuit comprising:
    a comparator for comparing an unrendered pixel signal and a threshold signal to produce a binary rasterized rendered output signal;
    a pixel multiplexor coupled to the comparator for selecting between a rasterized unrendered pixel signal and an error diffusion adjusted pixel signal;
    an error diffusion adder coupled to the pixel multiplexor for adding the rasterized unrendered pixel signal and an error diffusion feedback signal to produce the error diffusion adjusted pixel signal, wherein the error diffusion adder is further operable to add a previous error diffusion state signal to the rasterized unrendered pixel signal and the error diffusion feedback signal to produce the error diffusion adjusted pixel signal; and
    an error diffusion filter coupled to the unrendered pixel signal and the binary rasterized rendered output signal for generating the error diffusion feedback signal and a current error diffusion state signal.

2. A circuit as in claim 1, further comprising:
    an error diffusion adder coupled to the pixel multiplexor for adding the rasterized unrendered pixel signal and an error diffusion feedback signal to produce the error diffusion adjusted pixel signal.

3. A circuit as in claim 2, wherein the error diffusion adder is further operable to add a previous error diffusion state signal to the rasterized unrendered pixel signal and the error diffusion feedback signal to produce the error diffusion adjusted pixel signal, the circuit further comprising:
    a memory coupled to the error diffusion adder for storing a current error diffusion state signal and for retrieving the previous error diffusion state signal.

4. A circuit for generating a rasterized rendered datastream, the circuit comprising:
   a comparator for comparing an unrendered pixel signal and a threshold signal to produce a binary rasterized rendered output signal;
   a pixel multiplexor coupled to the comparator for selecting between a rasterized unrendered pixel signal and an error diffusion adjusted pixel signal;
   an error diffusion adder coupled to the pixel multiplexor for adding the rasterized unrendered pixel signal and an error diffusion feedback signal to produce the error diffusion adjusted pixel signal, wherein the error diffusion adder is further operable to add a previous error diffusion state signal to the rasterized unrendered pixel signal and the error diffusion feedback signal to produce the error diffusion adjusted pixel signal;
   a memory coupled to the error diffusion adder for storing a current error diffusion state signal and for retrieving the previous error diffusion state signal; and
   an error diffusion filter coupled to the unrendered pixel signal and the binary rasterized rendered output signal for generating the error diffusion feedback signal and the current error diffusion state signal.

5. A circuit as in claim 4, further comprising:
   an error diffusion write address generator coupled to the memory for providing an error diffusion write address signal indicating a memory location in which to store the current error diffusion state signal.

6. A circuit as in claim 5, further comprising:
   a threshold multiplexor coupled to the comparator for selecting between an error diffusion threshold signal and a halftone threshold signal.

7. A circuit as in claim 6, wherein the memory is further operable to retrieve a halftone threshold signal and is further coupled to the threshold multiplexor.

8. A circuit as in claim 7, further comprising:
   an error diffusion threshold register coupled to the threshold multiplexor for storing the error diffusion threshold signal.

9. A circuit as in claim 7, further comprising:
   a read address generator coupled to the memory for providing a read address signal indicating a memory location from which to read either the previous error diffusion state signal or the halftone threshold signal.

10. A circuit as in claim 9, wherein the read address generator comprises:
    a read address multiplexor coupled to the memory for selecting between an error diffusion read address signal and a halftone read address signal.

11. A circuit as in claim 10, wherein the read address generator further comprises:
    an error diffusion read address generator coupled to the read address multiplexor for providing an error diffusion read address signal indicating a memory location from which to read the previous error diffusion state signal.

12. A circuit as in claim 11, wherein the read address generator further comprises:
    a halftone read address generator coupled to the read address multiplexor for providing a halftone read address signal indicating a memory location from which to read the halftone threshold signal.

13. A circuit for generating a rasterized rendered datastream, the circuit comprising:
    a comparator for comparing an unrendered pixel signal and a threshold signal to produce a binary rasterized rendered output signal;
    a threshold multiplexor coupled to the comparator for selecting between an error diffusion threshold signal and a halftone threshold signal;
    a memory coupled to the threshold multiplexor for retrieving a halftone threshold signal, wherein the memory is further operable to store a current error diffusion state signal and to retrieve a previous error diffusion state signal; and
    an error diffusion adder coupled to the memory for adding the rasterized unrendered pixel signal and the previous error diffusion state signal to produce an error diffusion adjusted pixel signal.

14. A circuit as in claim 13, further comprising:
    an error diffusion threshold register coupled to the threshold multiplexor for storing the error diffusion threshold signal.

15. A circuit as in claim 13, further comprising:
    a read address generator coupled to the memory for providing a read address signal indicating a memory location from which to read either the previous error diffusion state signal or the halftone threshold signal.

16. A circuit as in claim 15, further comprising:
    an error diffusion write address generator coupled to the memory for providing an error diffusion write address signal indicating a memory location in which to store the current error diffusion state signal.

17. A circuit as in claim 15, wherein the read address generator comprises:
    a read address multiplexor coupled to the memory for selecting between an error diffusion read address signal and a halftone read address signal.

18. A circuit as in claim 17, wherein the read address generator further comprises:
    an error diffusion read address generator coupled to the read address multiplexor for providing an error diffusion read address signal indicating a memory location from which to read the previous error diffusion state signal.

19. A circuit as in claim 18, wherein the read address generator further comprises:
    a halftone read address generator coupled to the read address multiplexor for providing a halftone read address signal indicating a memory location from which to read the halftone threshold signal.

20. A read address generator for providing a read address signal to a memory for indicating a memory location from which to read either a previous error diffusion state signal or a halftone threshold signal, the read address generator comprising:
    a read address register for storing the read address signal; and
    a stride adder coupled to the read address register for adding the read address signal to a selected stride signal to produce a next read address signal; and
    a stride multiplexor coupled to the stride adder for providing the selected stride signal and having first and second stride inputs coupled to first and second stride signals, respectively.

21. A read address generator as in claim 20, wherein the stride multiplexor further has a control input tied to a stride select signal.

22. A read address generator as in claim 20, wherein the first and second stride signals correspond to an error diffusion stride value and a halftone stride value, respectively.

23. A read address generator for providing a read address signal to a memory for indicating a memory location from which to read either a previous error diffusion state signal or a halftone threshold signal, the read address generator comprising:

a read address register for storing the read address signal;

a stride adder coupled to the read address register for adding the read address signal to a selected stride signal to produce a next read address signal; and a reset multiplexor coupled to the read address register for setting the read address signal either to a predetermined starting read address signal value or to the next read address signal.

24. A read address generator as in claim 23, wherein the reset multiplexor further has a control input tied to a reset signal.

* * * * *